United States Patent
Robbins et al.

Patent Number: 5,137,620
Date of Patent: Aug. 11, 1992

[54] REFORMING PROCESS USING A PRETREATED CATALYST

[75] Inventors: John L. Robbins, Stockton; Elise Marucchi-Soos, Warren, both of N.J.; Ming Chow, Cupertino, Calif.; William E. Gates, Somerset; Shun C. Fung, Bridgewater, both of N.J.; Joseph P. Boyle, Baton Rouge, La.

[73] Assignee: Exxon Research and Engineering Company, Florham Park, N.J.

[21] Appl. No.: 703,310

[22] Filed: May 20, 1991

Related U.S. Application Data

[63] Continuation-in-part of Ser. No. 497,170, Mar. 22, 1990, Pat. No. 5,051,384.

[51] Int. Cl.$^5$ ............................................. C10G 35/06
[52] U.S. Cl. .................... 208/138; 208/134; 208/139
[58] Field of Search .................. 208/134, 138, 139

[56] References Cited

U.S. PATENT DOCUMENTS

| | | | |
|---|---|---|---|
| 3,424,671 | 1/1969 | Kay | 208/111 |
| 3,438,888 | 4/1969 | Spurlock | 208/138 |
| 4,097,543 | 6/1978 | Haag et al. | 260/672 T |
| 4,508,836 | 4/1985 | Haag et al. | 502/53 |

FOREIGN PATENT DOCUMENTS

0134076  6/1984  European Pat. Off.

Primary Examiner—Theodore Morris
Assistant Examiner—William C. Diemler
Attorney, Agent, or Firm—Estelle C. Bakun

[57] ABSTRACT

A reforming process using a Supported Group VIII noble metal reforming catalyst which has been pretreated with an unsaturated aliphatic hydrocarbon at elevated temperatures, thereby lowering activity during initial reforming operations and reducing gas production during the initial operation.

11 Claims, 2 Drawing Sheets

REFORMING PROCESS USING A PRETREATED CATALYST

CROSS REFERENCE TO RELATED APPLICATIONS

This application is a continuation in part of co-pending application Ser. No. 497,170 filed Mar. 22, 1990, now U.S. Pat. No. 5,051,384.

BACKGROUND OF THE INVENTION

1. Field of the Invention

The present invention relates to the improvement of the well-known catalytic reforming process which includes semi-regenerative, cyclic, semi-cyclic, and continuous circulating reactor processes. The improvement is accomplished by using a pretreated, passivated, reforming catalyst comprising at least one Group VIII noble metal and a support material, which catalyst has undergone pretreatment to eliminate hydrogenolysis in the early stages of the process.

2. Description of Prior Art

The catalytic reforming process is well known in the art. See for example U.S. Pat. Nos. 3,953,368, 4,579,648, and 4,541,915. Hydrocracking or hydrogenolysis during the reforming process is undesirable because it results in excessive gas yields. To obtain high quality products and yields, this reaction must be carefully controlled. The present process affords a means for accomplishing such control without the disadvantageous side effects which accompany methods presently employed.

Catalytic reforming is a process for converting hydrocarbon feedstocks containing mainly saturated hydrocarbons to more valuable aromatic compounds. Typically, naphtha, a mixture of paraffins, naphthenes and aromatics, is reformed to produce gasolines with high octane number. The reforming process is generally carried out by passing the naphtha over a suitable catalyst in the presence of hydrogen at elevated temperatures and pressures. The catalyst employed is generally platinum carried on a support material, for example alumina, silica, silica-alumina or crystalline aluminosilicates (zeolites). The catalyst may also include a second metal component, for example rhenium, tin or another Group VIII noble metal such as iridium or rhodium.

The reforming of naphtha involves several different reactions including isomerization, dehydrogenation of naphthenes to aromatics, dehydrogenation of paraffins to olefins, dehydrocyclization of paraffins and olefins to aromatics, and hydrocracking of paraffins to gaseous hydrocarbons such as methane and other lower alkanes. Ideally the reforming process minimizes the hydrocracking of paraffins and maximizes the reactions leading to the formation of more valuable products, particularly dehydrocyclization and dehydrogenation to aromatics.

During the initial stages of the reforming process the platinum-containing catalyst exhibits a high degree of hydrocracking activity leading to excessive formation of undesirable light hydrocarbons. As well as giving a lower yield of desired aromatic compounds, the hydrocracking reaction has the disadvantage that it is highly exothermic and can lead to temperature runaway in the reactor.

To lower the initial hydrocracking activity of the catalyst, it is known to passivate the catalyst by pretreating it with a sulfur-containing fluid such as hydrogen sulfide gas or an organic sulfide. This treatment has the disadvantage that it involves the use of a toxic, pungent, corrosive substance. Also, when the support material is a zeolite, especially a zeolite containing 1-dimensional channel-shaped pores such as a type L zeolite, the sulfur leads to excessive deactivation of the catalyst.

A further disadvantage connected with sulfur treatment arises when the reforming process is conducted in a cyclic mode. In a cyclic mode reforming process, several reactors are employed and are taken off-oil one by one for regeneration. After regeneration the catalyst in the reactor is presulfided and returned to service. The presulfiding sulfur is gradually depleted from the newly regenerated catalyst, and is carried downstream to succeeding reactors as well as recirculating to the preceding reactors with the recycle gas. The overall impact of this presulfiding sulfur is a drop in net reformer activity for some time after a regenerated reactor is brought on stream. Since the ethylene-pretreatment of the present method avoids the use of sulfur compounds, the drop in reformer activity seen after a presulfided catalyst if brought on oil, does not occur because the ethylene becomes bonded to the catalyst as coke and therefore cannot be stripped.

Other passivation techniques have been suggested in the past. U.S. Pat. No. 3,592,780 discloses a pretreatment method in which a platinum catalyst is contacted with naphtha containing at least 200 ppm sulfur in the presence of hydrogen at elevated temperatures and pressures for a number of hours. In U.S. Pat. No. 3,438,888 the pretreatment method consists of contacting a platinum-rhenium catalyst with a highly aromatic hydrocarbon stock at reforming conditions, in the presence of hydrogen, at elevated temperatures and pressures. This pretreatment is carried out for at least 0.5 hour and preferably a number of hours. To our knowledge neither of the pretreatment processes disclosed in these two patents has been used commercially.

SUMMARY OF THE INVENTION

The present invention relates to improving the well-known catalytic reforming process by using a reforming catalyst comprising at least one Group VIII noble metal and a support, which has undergone passivation by contacting the catalyst with an unsaturated aliphatic hydrocarbon at a temperature from 200 to 500° C. prior to introducing feed to the catalyst.

The pretreatment method lowers the level of activity of the catalyst during the initial stages of reforming, thereby decreasing the amount of undesired gaseous hydrocarbons produced, and alleviating the danger of temperature runaway in the reactor. This catalyst passivation is achieved without the use of unpleasant, toxic, sulphur compounds, and the method can be applied to a variety of conventional reforming catalysts, including zeolite-supported catalysts, without excessively deactivating the catalyst.

DESCRIPTION OF THE INVENTION

In a catalytic reforming process, a substantially sulfur-free naphtha stream that typically contains about 20-80 volume % paraffins, 20-80 volume % naphthenes, and about 5% to 20% aromatics, and boiling at atmospheric pressure substantially between about 80° and 450° F., preferably between about 150° and 375° F., is brought into contact with the catalyst system of the present invention in the presence of hydrogen. The reactions typically take place in the vapor phase at a temperature varying from about 650° to 1000° F., preferably about 750° to 980° F. Reaction zone pressures may vary from about 1 to 50 atmospheres, preferably from about 5 to 25 atmospheres.

The naphtha feedstream is generally passed over the catalyst at space velocities varying from about 0.5 to 20 parts by weight of naphtha per hour per part by weight of catalyst (w/hr/w), preferably from about 1 to 10 w/hr/w. The hydrogen to hydrocarbon mole ratio within the reaction zone is maintained between about 0.5 and 20, preferably between about 1 and 10. During the reforming process, the hydrogen employed can be an admixture with light gaseous hydrocarbons. Since the hydroforming process produces large quantities of hydrogen, a recycle stream is employed for admission of hydrogen with the feed.

In a typical operation, the catalyst is maintained as a fixed bed within a series of adiabatically operated reactors. Specifically, the product stream from each reactor (except the last) in the reactor series is reheated prior to passage to the following reactor.

A naphtha reforming operation involves a plurality of reactions that occur simultaneously. Specifically the naphthene portion of the naphtha stream is dehydrogenated to the corresponding aromatic compounds, the normal paraffins are isomerized to branched chain paraffins, and various aromatics compounds are isomerized to other aromatics. The high boiling components in the naphtha stream are also hydrocracked to lower boiling components. The reforming process can be of the semi-regenerative, cyclic, semi-cyclic, and continuous circulating reactor type.

Hydrocracking, or hydrogenolysis, involves the rupture of paraffin C—C bonds to yield lighter liquid and gas products. Because hydrocracking converts gasoline components into gas, it is the least desirable reforming reaction. The hydrocracking reaction must be controlled to obtain high product quality and yields.

A reforming catalyst is, even when the operating conditions are carefully controlled, characterized by high hydrocracking activity which produces considerable C$_4$- gas, especially methane, with consequently low C$_5$+ liquid production. As the operating run continues, the production of C$_5$+ hydrocarbons increases and lines out at production levels approximating a steady state operation, at which time the period of start-up is ended.

The pretreated catalyst of the present invention affords an improved method for controlling hydrocracking. The pretreated catalyst, which has a lower activity during the initial stages of reforming, produces a decreased amount of undesirable gaseous hydrocarbons during these initial stages. Furthermore, temperature runaway in the reactor is alleviated, and use of toxic sulphur compounds to achieve passivation is eliminated.

Runaway exotherms are characterized as extreme temperature increases over a short period of time over and above the temperature increase created by the catalyst itself. Runaway exotherms can develop when reforming catalysts are first exposed to hydrogen/hydrocarbon feed, when they are rapidly heated while in hydrogen/hydrocarbon feed, or following unit upsets such as a sudden drop in hydrocarbon feed rate. The pretreated catalyst of the present invention effectively prevents runaway exotherms during the initial stages of reforming, and delays them following unit upsets.

Because unit upsets involve extreme alterations in reaction conditions, in contrast to the initial stages of reforming during which reaction conditions are carefully controlled, the runaway exotherms that follow are inevitable and cannot be alleviated. However, the present invention delays such exotherms, affording a time during which corrective measures can be implemented, e.g., lowering temperature, reducing pressure, reestablishing feed.

Figure 2:
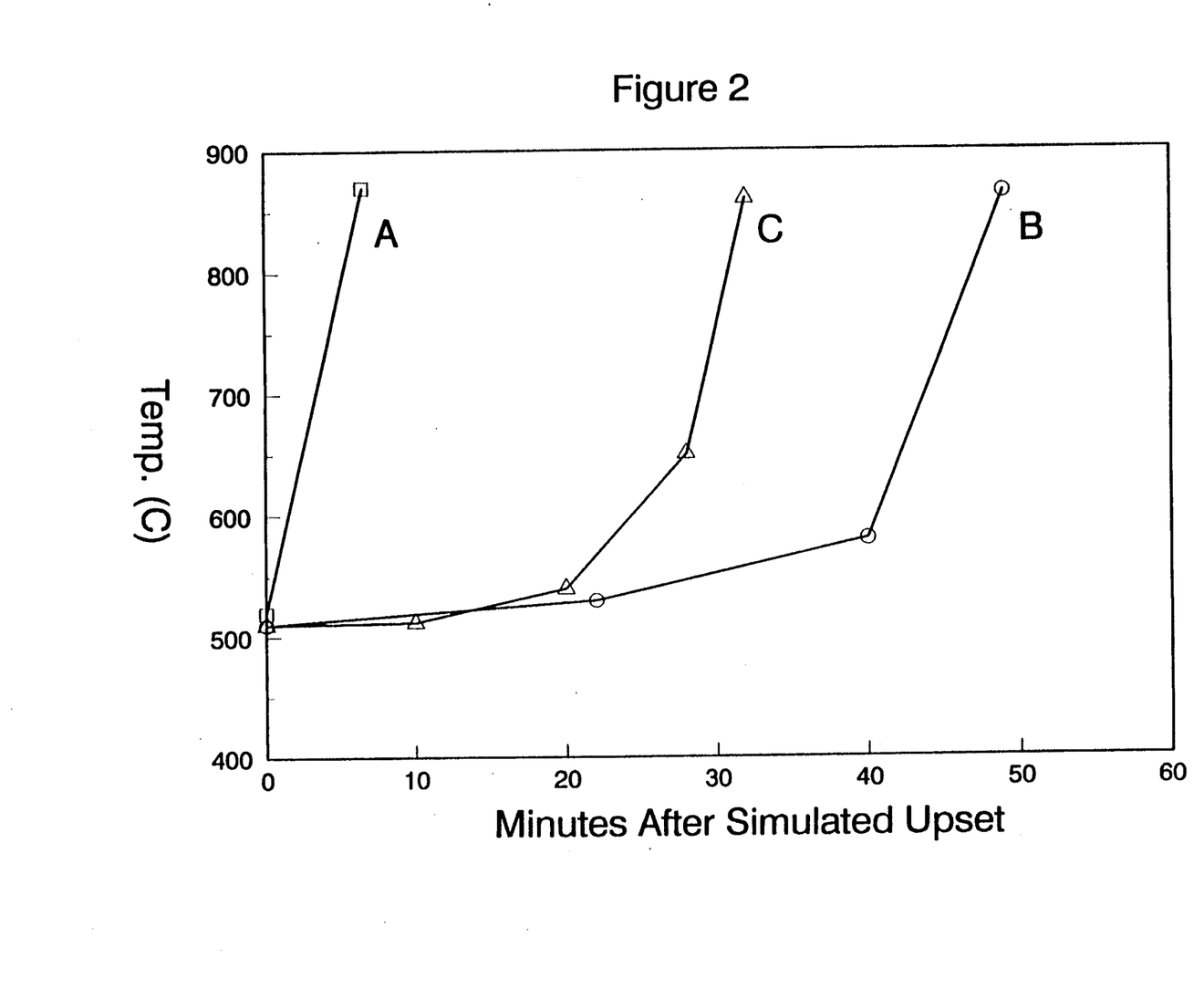
FIG. 2 is a graph showing the response of reaction temperature following a feed rate change for the Pt/Ir catalyst pretreated with ethylene according to example 7: H$_2$S for two minutes at 450° C., and with no pretreatment other than routine hydrogen reduction.

FIG. 2 shows that both sulphur deedging and ethylene pretreatment delay runaway exotherms following a unit upset. However, ethylene pretreatment has the following advantages: it is much less toxic, it does not poison the catalyst, it is not corrosive, and it affords a longer time delay. Furthermore, the products produced from ethylene; methane, ethane, and propane are inocuous and do not deactivate catalysts in subsequent reactors if carried downstream.

The unsaturated aliphatic hydrocarbon with which the catalyst is pretreated is preferably an olefin. It is also preferably in the gaseous phase, and therefore, preferred olefins are ethylene and propylene or a mixture thereof. Hereinafter, the invention will be described with reference to olefins, although it is to be understood that other unsaturated aliphatic hydrocarbons may be substituted for the olefins.

When the catalyst is contacted with the olefin it is believed that the olefin reacts to deposit carbon on the surface of the catalyst. It is thought that the carbon is adsorbed on to some of the noble metal particles and that these metal particles then become deactivated towards naphtha reforming at least until the carbon is removed, for example by reaction with the hydrogen present in the reforming process. The olefin reaction therefore requires controlling so that sufficient carbon is deposited to passivate the catalyst during the initial stages of reforming and hence inhibit undesired hydrocracking reactions, without depositing so much carbon that it completely deactivates the catalyst towards the reforming of naphtha to desired products such as aromatic hydrocarbons.

An important controlling parameter is the temperature at which the olefin reaction is carried out, i.e., between 200° C. and 500° C., preferably 300° C. to 500° C. If too high a temperature is used then the yield of desired aromatic products drops substantially, likely because of an excess of carbon adsorbing onto the catalyst as a result of the olefin reaction. Conversely, if too low a temperature is used then the catalyst behaves much the same as a fresh, unpassivated catalyst, likely because of insufficient carbon depositing during the olefin reaction to affect the high initial hydrocracking activity levels of the catalyst. Preferably the olefin is contacted with the catalyst as a gaseous stream containing at least 0.1% by volume olefin, more preferably from 0.1 to 10%, especially 0.1 to 5%. The remainder of the gas is preferably an inert gas, for example nitrogen or helium. The gaseous stream may be fed into the reactor, for example a reforming reactor, as a continuous flow or as a series of pulses. Alternatively, the inert gas may be fed into the reactor as a continuous flow and the olefin injected into the inert gas flow at regular intervals. As another alternative, the olefin may be introduced into a reactor employing a recycle stream in which an oxygen-free inert gas, such as helium or nitrogen, is circulating through the catalyst bed. The olefin, in a calculated amount of from 3 to 1000 carbon atoms per surface noble metal atom is added to the recycle stream either all at once or at regular intervals.

The reaction of the olefin with the catalyst may be carried out at any suitable pressure, although for practical purposes this would not normally exceed 40 MPa. Conveniently the reaction may be carried out at atmospheric pressure.

Prior to bringing the reactor on oil, the catalyst is contacted with the olefin for a period of time to allow for an amount of coke deposition sufficient to prevent exotherms during the initial stages of reforming.

The olefin contact is accomplished by injecting 1-20 lbs olefin/1000 lb catalyst, preferably 1-10 lbs olefin/1000 lb catalyst, and especially 1-5 lbs olefin/1000 lb catalyst. The contact period ranges from 3 minutes to ten hours, preferably 15 minutes to 2 hours and especially 15 minutes to one hour. The temperature ranges from 300° to 550° C., preferably 400° to 500° C., and especially 425° to 475° C.

Following the olefin contact, the reactor gases may be recirculated for a period of 15 minutes to 48 hours, preferably 1 to 24 hours, and especially 2 to 12 hours. Recirculation prevents small temperature jumps which occur when the reactor is first brought on oil. Prevention of small temperature jumps prevents the hydrocracking they produce, affording a 0.5 liquid volume % increase in product per cycle. Each cycle begins upon reaching line out and continues for a predetermined time based on catalyst performance, e.g., yield, and after which the catalyst may be regenerated.

The pretreatment method also has the advantage of being essentially thermoneutral, likely because two main reactions can occur when the catalyst is contacted with the olefin: olefin adsorption on to the noble metal and decomposition releasing hydrogen, an endothermic reaction; and hydrogen released by the first reaction reacting with free olefin producing alkanes, an exothermic reaction. The alkanes pass out of the reactor with the flow of gas passing through the reactor. Hence, the endothermic and exothermic reactions essentially balance each other.

If desired, the reaction of the catalyst with the olefin may be followed by an annealing step in order to stabilize the deposited carbon. This annealing may be carried out by heating the catalyst in an inert gas atmosphere, for example, helium or nitrogen at a temperature of 300° to 500° C., preferably 400° to 500° C., for a period of 30 minutes to 2 hours.

Advantageously the olefin pretreatment according to the invention is carried out in the substantial absence of oxygen and water. These can react with the carbon deposited on the catalyst surface to form carbon monoxide which is a known poison for reforming catalysts.

The pretreatment method may be applied to both freshly synthesized catalysts and to regenerated catalysts. The method of preparing the fresh and regenerated catalysts can be any of the conventional methods well known in the industry, although to take full benefit of the invention it is advantageous to prepare the catalysts in the essential absence of sulfur.

Usually the final stage in the preparation of a fresh or regenerated catalyst is reduction, typically by contacting the catalyst with hydrogen at a temperature from 250° to 650° C. For example, the catalyst is heated at a temperature of from about 300° to about 530° C. for up to 10 hours in the presence of a gaseous stream comprising from 0.2 to 100% by volume of hydrogen, the balance being an inert gas such as nitrogen. Optionally the catalyst may be dried prior to reduction by contacting it with a dry inert gas at a temperature from about 50° to about 500° C. The pretreatment method according to the invention is preferably included after this reduction step. The catalyst may be treated again with hydrogen after the olefin treatment. The subsequent hydrogen treatment will tend to remove some of the carbon deposited on the catalyst during the olefin pretreatment process. This may be beneficial if a higher initial level of catalytic activity is required, for example if reforming is to be carried out at a relatively low initial temperature or if the feedstock for reforming contains relatively high molecular weight hydrocarbons.

The Group VIII noble metals which are necessary for catalytic activity are those metals from Group VIII of the Periodic Table of Elements which are selected from ruthenium, rhodium, iridium, palladium and platinum. Preferably, the metals which are employed herein are platinum, rhodium or iridium, and most preferably platinum or a combination of two or more metals, one of which is platinum. The metals may be present in any combination desired. Rhenium, a Group VIIB metal, may also be present so long as at least one Group VIII noble metal is present, preferably platinum.

The amount of Group VIII noble metal present in the catalyst will be an effective amount and will depend, for example, on required catalyst activity, ease of uniform dispersion, and the type of catalyst support. For zeolites, crystal size limits the effective catalyst loading since highly loaded crystals of zeolite which have a large dimension parallel to the channels could easily lead to pore plugging during operation as the noble metal agglomerates inside the channels. Generally, however, the level of metal present will range from about 0.1 to 6%, preferably 0.1 to 3.5% and more preferably 0.1 to 2.5% by weight of the catalyst. Furthermore, for zeolites, the amount of metal present is generally from about 0.1 to 2.0% by weight of the catalyst if the average zeolite crystallite size parallel to the channels is greater than about 0.2 micron, and from about 1.0 to 6% by weight if the average zeolite crystalline size parallel to the channels is no greater than about 0.2 micron.

The Group VIII noble metals may be introduced on to the support by, for example, ion exchange, impregnation, carbonyl decomposition, adsorption from the gaseous phase, introduction during zeolite synthesis, and adsorption of metal vapor. The preferred technique is ion exchange. In some cases, e.g., when the metal(s) have been introduced on to zeolites by an ion-exchange process, it is preferred to remove the residual acidity of the support material by treating the catalyst, which has previously been reduced by hydrogen, with an aqueous solution of an alkaline base such as potassium carbonate. This treatment will neutralize any hydrogen ions formed during the reduction of Group VIII noble metal ions by hydrogen.

The catalyst support may be, for example, an inorganic oxide such as alumina, titanium dioxide, zinc oxide, magnesium oxide, thoria, chromia, zirconia, an amorphous silica-alumina, tin modified alumina, a zeolite, for example, faujasite, mordenite, X, Y or L zeolites, a clay such as china clay, kaolin, bentonite, diatomaceous earth or other silicon-based materials such as silica gel or silicon carbide, or a mixture of one or more of the above. Preferably, the support is alumina or a zeolite, more preferably a zeolite, and especially a type L zeolite.

In the step of forming the tin-containing support, a tin salt, e.g., stannous chloride, stannic chloride, stannic tartrate, stannic nitrate, or the like, can be uniformly dispersed throughout a solid support or carrier by the method described in U.S. Pat. No. 4,963,249 issued Oct. 16, 1990, specific reference being made to column 6, lines 15 through 23, and columns 58 through 69, inclusively, herewith incorporated by reference.

Type L zeolites may be defined as synthetic zeolites which crystallize in the hexagonal system. They have channel-shaped pores undulating from about 7 to 13Å in diameter and may occur in the form of cylindrical crystals with a mean diameter of at least 0.5 micron and an aspect ratio of at least 0.5 (as described, for example, in U.S. Pat. No. 4,544,539, the disclosure of which is incorporated herein by reference), as well as in other shapes and sizes. L zeolites typically have the general formula:

$$0.9\text{-}1.3\ M_{2/n}O:Al_2O_3: xSiO_2: yH_2O$$

M represents an exchangeable cation, n represents the valency of M, y is any value from zero to about 9, and x is about 5.2 to about 6.9.

A more complete description of L zeolite is given in U.S. Pat. No. 3,216,789 the disclosure of which is incorporated herein by reference.

The type L zeolites are conventionally prepared such that M in the above formula is potassium. See, for example, U.S. Pat. Nos. 3,216,789 and 3,867,512. The potassium can be ion exchanged, as is well known, by treating the zeolite in an aqueous solution containing other cations. It is difficult, however, to exchange more than 75% of the original potassium cations, because some cations occupy sites in the zeolite structure which are nearly inaccessible. At least 75% of the exchangeable cations are selected from lithium, sodium, potassium, rubidium, cesium, calcium and barium. More preferably, the cation is sodium, potassium, rubidium or cesium, and most preferably potassium. Optionally, the exchangeable cations may consist of mixtures of the above-named Group IA cations or mixtures of a Group IA cation and barium or calcium cations. These mixtures of cations may be achieved, for example, by treating the zeolite L with an aqueous solution containing, e.g., a rubidium and/or cesium salt and then washing to remove excess ions. This ion exchange treatment can be repeated to effect further ion exchange, although to a lesser degree.

Particularly preferred catalysts are platinum/alumina, platinum/zeolite, especially platinum/L zeolite, platinum-rhenium/alumina and platinumiridium/alumina.

EXAMPLES

The invention will now be illustrated by the following Examples.

EXAMPLE 1

A catalyst consisting of platinum on a potassium-exchanged zeolite ("Pt/KL zeolite") was prepared as follows:

An L zeolite having a composition expressed in moles of pure oxide of $0.99\ K_2O : Al_2O_3: 6.3\ SiO_2: xH_2O$ and having a cylindrical shape and an average particle size of about 2 to 2.5 microns was prepared by the technique described in Example 1 of U.S. Pat. No. 4,544,539. Thus, an alkaline synthesis gel was prepared by dissolving 23.4 g of aluminum hydroxide by boiling in an aqueous solution of 51.2 g potassium hydroxide pellets (86% pure KOH) in 100.2 g water to form Solution A. After dissolution any water loss was corrected. A separate solution, Solution B, was prepared by diluting 225 g colloidal silica (Ludox HS 40) with 195 g water. Solutions A and B were mixed for two minutes to form a gel, and just before the gel became fully stiff, 224 g thereof were transferred to a Teflon-lined autoclave, preheated to 150° C., and held at that temperature for 72 hours to bring about crystallization, after which the solid zeolite was separated out.

Platinum was then incorporated in the above prepared zeolite support by slurrying the zeolite in water and adding $Pt(NH_3)_4\ Cl_2$ solution over about a 2 hour period at a pH of 10. Following the addition of the platinum solution the mixture was stirred overnight and filtered. The resulting Pt/KL zeolite which contained 0.6% Pt, was dried, tableted, crushed and screened to 20/40 mesh.

10 g of the Pt/KL zeolite was then calcined at 350° C. in a reactor at atmospheric pressure with a gas stream of 10% dry $O_2$ at a flow rate of 500 ml/minute for 2 hours. The catalyst was then reduced with a gas stream of 10% $H_2$ at a flow rate of 500 ml/minute for 2 hours at a temperature of 400° C. The resulting catalyst is hereinafter referred to as untreated Pt/KL catalyst.

The catalyst was then pretreated with olefin prior to use in a reforming process. 0.25 g of the untreated Pt/KL catalyst was charged into a quartz reactor and treated with 100 ml/minute $H_2$ at 510° C. for 2 hours and then cooled to 377° C. in flowing $H_2$. The reactor was then purged with 100 ml/minute He at 350° C. for 10 minutes, followed by treatment with 100 ml/minute 1% ethylene in He for 5 minutes at 350° C. The ethylene/He flow was then discontinued and 100 ml/minute $H_2$ was introduced as the reactor temperature was increased to 377° C.

The performance of the ethylene treated catalyst was evaluated using a hexane reforming test. After continuing the flow of the $H_2$ for 5 minutes hexane was introduced at an $H_2$:hexane ratio of 16:1 and the reforming was carried out at atmospheric pressure, a temperature of 377° C. and a space velocity of 6.6 V/V/hour. The products obtained in this reforming test were measured after 5 and 155 minutes catalyst operation under the above conditions. The results are given in Table 1.

For comparative purposes the performance of the untreated Pt/KL catalyst was also evaluated. 2.5 g of the above prepared untreated Pt/KL catalyst was charged into a quartz reactor and treated with 100 ml/minute $H_2$ at 510° C. for 2 hours and then cooled to 377° C. in flowing $H_2$. A hexane reforming test was then carried out using the same conditions as described above for the ethylene treated catalyst. The results are also given in Table 1.

TABLE 1

| | Catalyst | | | |
|---|---|---|---|---|
| | Pt/KL | | Ethylene-treated Pt/KL | |
| Time on stream (min) | 5 | 155 | 5 | 155 |
| Total Hexane Conversion (%) | 31.2 | 25.6 | 22.7 | 21.9 |
| Product Concentration (wt. %) | | | | |
| $C_1$–$C_5$[1] | 3.2 | 2.1 | 2.1 | 1.7 |
| MCP + 2 MP + 3 MP[2] | 13.7 | 11.2 | 9.9 | 9.5 |
| Benzene | 13.8 | 11.9 | 10.4 | 10.5 |

[1]Hydrocracking products, $C_1$ to $C_5$ paraffins
[2]Isomerization products, methylcyclopentane (MCP), 2-methylpentane (2 MP), and 3-methylpentane (3 MP).

The results show that after 5 minutes on stream the ethylene treated Pt/KL catalyst produced 34% less hydrocracking products ($C_1$–$C_5$ paraffins) than the equivalent untreated catalyst. At the same time the yield of desired benzene product is reduced by only 25% using the ethylene treated catalyst. After 155 minutes on stream the ethylene treated catalyst yielded 19% and 12% less hydrocracking products and benzene respectively. Thus the olefin pretreatment lowers the yield of undesired hydrocracking products without significantly reducing the yield of desired aromatic products.

EXAMPLE 2

In this Example a conventional platinumrhenium catalyst was employed containing 0.3 wt.% Pt, 0.3 wt.% Re and 1 wt.% chlorine on a gamma alumina base. The catalyst extrudates are crushed and sieved to 20 to 40 mesh.

The catalyst was then pretreated with olefin prior to use in a reforming process. 0.25 g of the Pt-Re catalyst was charged into a glass reactor and treated with $H_2$ at a flow rate of 200 ml/minute at atmospheric pressure for 1 hour at 510° C. The catalyst was next purged with He at a flow rate of 400 ml/minute for 10 minutes and then followed by treatment with 1 vol.% ethylene in He at a flow rate of 100 ml/minute at a temperature of 300° C. for 5 minutes at atmospheric pressure. The flow of ethylene in He was discontinued and the catalyst purged with 400 ml/minute He at 300° C. for 10 minutes.

The performance of the ethylene treated Pt-Re catalyst was evaluated using a methylcyclopentane (MCP) reforming test. The catalyst was treated with $H_2$ at a flow rate of 500 ml/minute for 30 minutes at 400° C. and then cooled to 377° C. in flowing $H_2$. The hydrocarbon feed was then introduced at an $H_2$:MCP ratio of 18:1, a temperature of 370° C., a pressure of 1 atmosphere and a space velocity of 4.4 V/V/Hr. The results are given in Table 2.

The ethylene pretreatment and the MCP reforming test were repeated on two further fresh samples of the Pt-Re/$Al_2O_3$ except that the pretreatment temperature was altered to 400° and 450° C. respectively. These pretreated catalysts were also subsequently treated with He and $H_2$ as described above except that for the catalyst pretreated with ethylene at 450° C., the final hydrogen treatment was also carried out at 450° C. The results of the MCP reforming tests are also given in Table 2.

For comparative purposes the performance of the untreated Pt-Re/$Al_2O_3$ catalyst was also evaluated. 0.25 g of the catalyst was charged into a glass reactor and treated with $H_2$ followed by reforming with MCP as described for the ethylene pretreated catalyst. The results are again given in Table 2.

TABLE 2

| | Products from MCP Conversion (wt %) | | | | | | | | | |
|---|---|---|---|---|---|---|---|---|---|---|
| | $CH_4$ + CP | | 2 MP + 3 MP + $nC_6$ | | 1 MCPe | | Benzene | | Total Conversion | |
| Temp. (°C.) | 5* | 155* | 5 | 155 | 5 | 155 | 5 | 155 | 5 | 155 |
| 300 | 0.92 | 0.33 | 10.56 | 4.28 | 1.74 | 1.90 | 2.69 | 2.29 | 17.08 | 9.63 |
| 400 | 0.51 | 0.21 | 5.08 | 2.56 | 1.95 | 1.98 | 3.02 | 2.33 | 11.56 | 7.93 |
| 450 | 0.40 | 0.17 | 3.56 | 1.81 | 1.96 | 1.98 | 3.34 | 2.35 | 10.15 | 7.24 |
| No pretreatment | 1.03 | 0.30 | 12.00 | 4.04 | 1.67 | 1.88 | 3.21 | 2.29 | 19.22 | 9.29 |

*Time in minutes
CP = cyclopentane
2 MP = 2-methylpentane
3 MP = 3-methylpentane
1 MCPe = 1-methylcyclopentene The results show that by pretreating the catalyst with ethylene a considerable reduction in the amount of undesired alkanes (methane, cyclopentane, n-hexane and methylpentane) is achieved, especially during the initial stages of the reforming process, without any substantial loss in the yield of the desired dehydrogenation products (benzene and methylcyclopentene). As the alkanes arise from exothermic hydrocracking reactions, it is apparent that the ethylene pretreatment mitigates exotherms during the initial stages of the reforming process. The benefits are particularly noticeable for the catalysts pretreated at the higher temperatures of 400° and 450° C.

EXAMPLE 3

In this Example a platinum-iridium catalyst was employed containing 0.6 wt.% Pt, 0.6 wt.% Ir and 1 wt.% Chlorine on a gamma alumina support. This catalyst was prepared according to the methods described in U.S. Pat. No. 3,953,368. The catalyst extrudates were crushed and sieved to 20 to 40 mesh.

The catalyst was then pretreated with olefin. 0.25 g of the catalyst was charged into a quartz reactor and then treated with $H_2$ at a flow rate of 200 ml/minute at atmospheric pressure for 1 hour at 510° C., and then purged with 400 ml/minute He for 10 minutes at 450° C. Ethylene was then fed into the reactor as the gas stream consisting of 1 vol.% ethylene in He at a flow rate of 100 ml/minute for 5 minutes at a temperature of 450° C. at atmospheric pressure. The catalyst was then purged with He at a flow rate of 400 ml/minute for 10 minutes at a temperature of 450° C. and then with hydrogen at a flow rate of 500 ml/minute for 30 minutes at 450° C The catalyst was cooled to 377° C. and a MCP reforming test was conducted as described in Example 2. The results are given in Table 3. For comparative purposes the performance of the untreated Pt-Ir/Al$_2$O$_3$ catalyst was also evaluated using the H$_2$ treatment and MCP reforming conditions as described in Example 2. The results are also given in Table 3.

TABLE 3

| Conversion | Catalyst and Time on Stream (min) | | | |
|---|---|---|---|---|
| | Pretreated | | Not Pretreated | |
| Products (wt %) | 5 | 155 | 5 | 155 |
| CH$_4$ + CP | 1.18 | 0.73 | 2.62 | 1.27 |
| C$_2$–C$_5$ paraffins | 2.49 | 1.01 | 6.72 | 2.07 |
| 2 MP + 3 MP + nC$_6$ | 6.85 | 3.92 | 16.83 | 7.73 |
| 1 MCPe | 1.76 | 1.88 | 1.42 | 1.77 |
| Benzene | 2.78 | 1.48 | 3.65 | 1.89 |
| Total Conversion | 16.02 | 9.70 | 32.46 | 15.49 |

CP = cyclopentane
2 MP = 2-methylpentane
3 MP = 3-methylpentane
1 MCPe = 1-methylcyclopentene The results show that use of the ethylene pretreated catalyst results in a substantial reduction in the yield of undesired alkane products, especially in the initial stages of the reforming reaction. The yields of the desired dehydrogenation products, benzene and methylcyclopentene, are not substantially affected by the ethylene pretreatment.

EXAMPLE 4

A reforming catalyst containing 0.3 wt.% Pt, 0.3 wt.% Re and 0.84 wt.% chlorine was removed through a reactor after it had been used in a commercial naphtha reforming process for 1,000 hours, during which period it had been regenerated 4 times. Prior to its removal from the reactor the catalyst was treated with 0.2 vol.% oxygen in helium at 480° C. for 20 hours and then 2 vol.% oxygen in nitrogen at 510° C. for 10 hours. The catalyst extrudates were then crushed and sieved to 20 to 40 mesh.

The catalyst was then treated with olefin as described in Example 2 except that the temperature of the reactor during introduction of the ethylene-He stream and subsequent He purge and H$_2$ treatment was 400° C. instead of 450° C. The performance of this ethylene-treated catalyst in reforming reaction was then evaluated using MCP as the hydrocarbon feed as described in Example 2. The results are given in Table 4.

A further 0.25 g of the removed catalyst was treated with ethylene as described above except that the temperature of the reactor during introduction of the ethylene feed and the subsequent helium purge and H$_2$ treatment were carried out at 450° C. This catalyst was also evaluated using a MCP reforming test as described above, and the results are also given in Table 4.

For comparative purposes the performance of the untreated catalyst was also evaluated. 0.25 g of the catalyst removed from the reactor, after undergoing the oxygen treatments as described above, was treated with H$_2$ as described in Example 2 and then evaluated using a MCP reforming test as described above, the results are also given in Table 4.

TABLE 4

| | Products from MCP Conversion (wt %) | | | | | | | | | |
|---|---|---|---|---|---|---|---|---|---|---|
| | CH$_4$ + CP | | 2 MP + 3 MP + nC$_6$ | | 1 MCPe | | Benzene | | Total Conversion | |
| Temp. (°C.) | 5* | 155* | 5 | 155 | 5 | 155 | 5 | 155 | 5 | 155 |
| 400 | 0.46 | 0.27 | 4.23 | 2.92 | 1.94 | 1.94 | 3.98 | 3.55 | 11.43 | 9.45 |
| 450 | 0.36 | 0.20 | 2.87 | 1.81 | 1.91 | 1.96 | 4.11 | 3.37 | 10.00 | 8.07 |
| No pre-treatment | 0.83 | 0.36 | 8.91 | 4.43 | 1.87 | 2.03 | 5.32 | 3.45 | 18.06 | 11.09 |

*Time in minutes
CP = cyclopentane
2 MP = 2-methylpentane
3 MP = 3-methylpentane
1 MCPe = 1-methylcyclopentene The results show that the ethylene-treated catalysts give essentially the same yields of the desired products, benzene and methylcyclopentene, as the untreated catalyst, but a much lower yield of the undesired hydrocracking products.

EXAMPLE 5

A reforming catalyst containing 0.6 wt.% Pt and 0.6 wt.% Ir was removed from a reactor after it had been used in a commercial naphtha reforming process for 1,000 hours, during which period it had been regenerated 4 times. Prior to its removal from the reactor the catalyst was treated with 0.4 vol.% oxygen in nitrogen for 20 hours at 480° C. and then with 2 vol.% oxygen in nitrogen for 20 hours at 520° C. The catalyst extrudates were crushed and sieved to 20 to 40 mesh.

0.25 g of the catalyst was then treated with ethylene as described in Example 2, except that the ethylene in helium, helium purge and hydrogen treatments were carried out at 350° C. The performance of the catalyst was then evaluated using a MCP reforming test also as described in Example 2.

A further 0.25 g of the catalyst was also treated with ethylene as described in Example 2 except that the ethylene, subsequent helium and hydrogen treatments were carried out at 400° C. Again the performance of this catalyst was evaluated using a MCP reforming test as described in Example 2, the results are given in Table 5.

For comparative purposes the performance of the untreated Pt-Ir catalyst was also evaluated, using a 0.25 g sample of the catalyst removed from the reactor, after the oxygen treatments as described above, and using the hydrogen treatments and MCP reforming conditions as described in Example 2. The results are also given in Table 5.

TABLE 5

| Temp. (°C.) | Products from MCP Conversion (wt %) | | | | | | | | | | |
|---|---|---|---|---|---|---|---|---|---|---|---|
| | $CH_4$ + CP | | $C_2$-$C_5$ Paraffins | | 2 MP + 3 MP + $nC_6$ | | 1 MCPe | | Benzene | | Total Conversion |
| | 5* | 155* | 5 | 155 | 5 | 155 | 5 | 155 | 5 | 155 | 5 | 155 |
| 350 | 0.31 | 0.22 | 0.60 | 0.36 | 6.25 | 4.12 | 1.67 | 1.71 | 4.41 | 4.40 | 14.29 | 11.80 |
| 400 | 0.24 | 0.18 | 0.34 | 0.23 | 3.52 | 2.74 | 1.78 | 1.80 | 5.05 | 4.98 | 12.04 | 11.08 |
| No pre-treatment | 0.53 | 0.28 | 1.11 | 0.44 | 12.85 | 5.62 | 1.54 | 1.70 | 5.70 | 4.59 | 22.95 | 13.60 |

*Time in minutes
CP = cyclopentane
2 MP = 2-methylpentane
3 MP = 3-methylpentane
1 MCPe = 1-methylcyclopentene The results show that the ethylene-treated catalysts give much lower yields of the undesired hydrocracking products than the untreated catalyst, especially during the initial stages of the reforming process. In addition, the catalyst treated with ethylene at 400° C. gave higher yields of benzene, the desired product, than the untreated catalyst after 155 minutes on stream.

EXAMPLE 6

0.5 g of the regenerated Pt-Ir/$Al_2O_3$ catalyst obtained from the reactor described in Example 5 was mixed thoroughly with 0.5 g of a quartz diluent, and this catalyst/quartz mixture was charged into a 7 mm ID stainless steel reactor. The catalyst was treated with $H_2$ at a flow rate of 250 ml/minute for 30 minutes at a temperature of 500° C. and a pressure of 2 atmospheres. The reactor temperature was reduced to 450° C. and the catalyst purged with 250 ml/minute $N_2$ at a pressure of 2 atmospheres and a temperature of 450° C. for 10 minutes. The catalyst was then treated with ethylene by contacting it with a stream containing 1 vol.% ethylene in nitrogen at a pressure of 2 atmospheres and a flow rate of 100 ml/minute for 10 minutes at 450° C. The ethylene in nitrogen flow was discontinued and then nitrogen introduced at a flow rate of 250 ml/minute and a pressure of 2 atmospheres. The nitrogen flow was discontinued and the reactor was pressurized to 10.9 atmospheres with hydrogen at 450° C. Hydrogen was passed over the catalyst at this temperature and pressure for 30 minutes at a flow rate of 250 ml/minute.

The performance of this ethylene-treated catalyst was then evaluated by measuring the products obtained in a reforming process with n-heptane. The reforming process was carried out at an $H_2$:heptane ratio of 5.9±0.1, a temperature of 500° C., a pressure of 10.9 atmospheres and a space velocity of 20 V/V/Hr for 1 hour.

Figure 1:
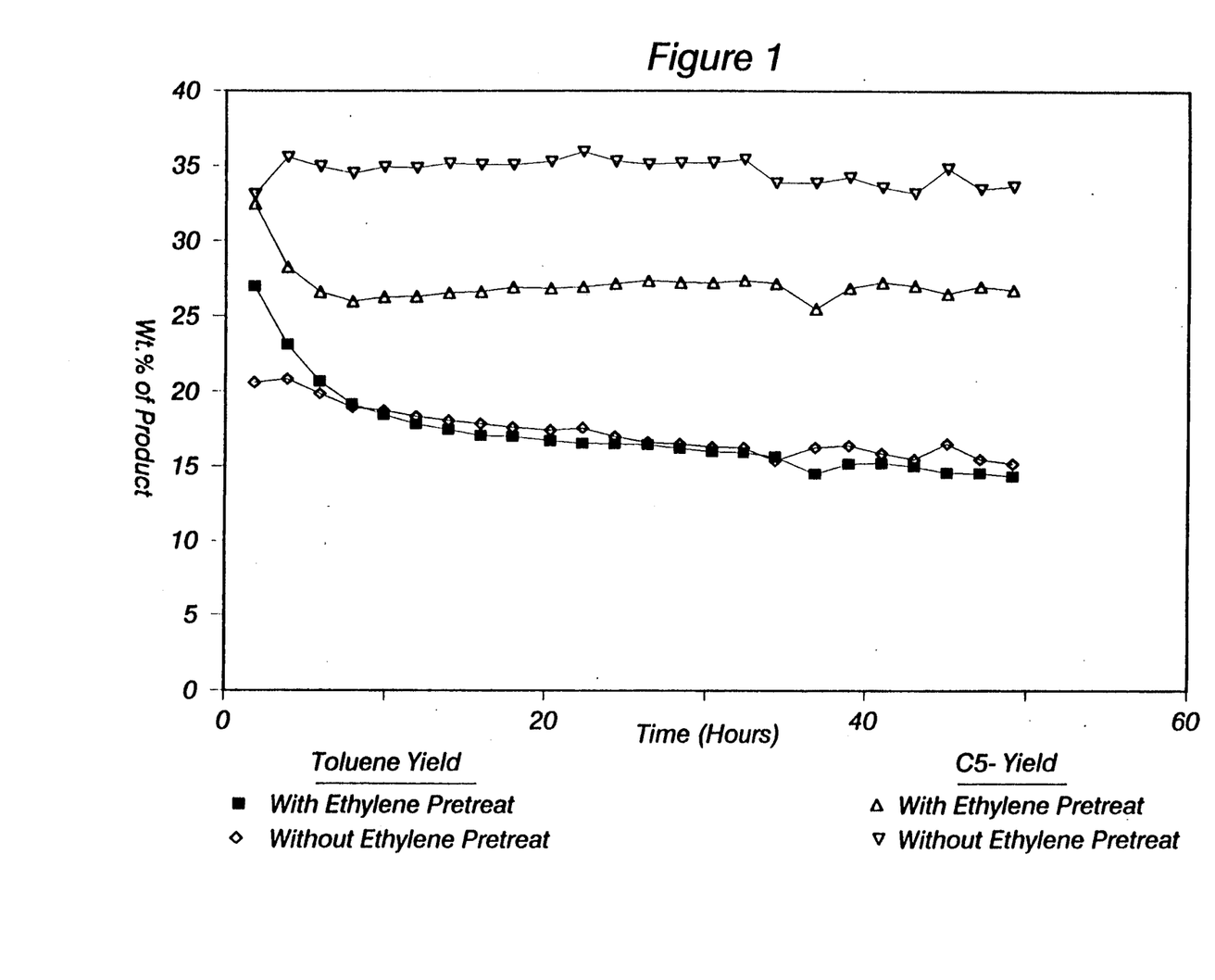
FIG. 1 is a graph showing the results obtained from using a catalyst pretreated with olefin in a catalytic reforming process. The graph also shows comparative results obtained from using an equivalent, untreated catalyst.

The results of this test are shown in FIG. 1 where the concentrations of the desired product, toluene, and undesired hydrocracking products, $C_1$-$C_5$ alkanes, are plotted as a function of time in the reactor. FIG. 1 also shows the plots of data obtained under the same catalytic conditions for the same Pt-Ir/$Al_2O_3$ catalyst treated with hydrogen at 500° C. as described above but with the ethylene treatment omitted. It can be seen from FIG. 1 that the production rate of toluene is essentially identical for both the treated and untreated catalyst. However, the ethylene treated catalysts show the marked reduction in the production of $C_1$-$C_5$ alkanes which arise from exothermic hydrocracking reactions.

EXAMPLE 7

100 g of the regenerated catalyst obtained from the reactor described in Example 5 was thoroughly mixed with 100 g of quartz diluent, and this catalyst/quartz mixture was charged into a 24.5 inch long, 1 inch ID fixed bed reactor equipped with a feed preheater and four internal thermocouples located along the length of the bed. The catalyst was treated with flowing $H_2$ at 500 psig and 454° C. for 4 hours, and purged with He at 15 psig and 454° C. for 1 hour. The catalyst was next treated with 1 vol.% ethylene in helium at 454° C. and a flow rate of 2360 mL/minute at 15 psig for a period of 30 minutes. The reactor was then purged with helium for 15 minutes at 421° C., and pressurized to 500 psig with hydrogen at 421° C. A hydrocarbon feed, whose properties are listed in Table 6, was then introduced along with hydrogen at 427° C. Catalytic reforming of the hydrocarbon feed was carried out under the following conditions: 2.1 moles hydrogen per mole of hydrocarbon, 500 psig total pressure, and a hydrocarbon feed rate of 735 grams of hydrocarbon per hour. No exotherms developed during the hydrocarbon introduction step. The reactor was maintained under these conditions at 427° C. for one hour at which point the reactor was heated to 502° C. at an average rate of 14° C./hour. No exotherms exceeding 20° C. occurred in the catalyst bed during this heating period.

A reforming product sample was collected and analyzed after 15 hours of operation under the above conditions (502° C. bed temperature). The analysis indicated a hydrocarbon liquid yield of 86.6% with a Research Octane Number of 98.3 (octane determined by engine testing). The catalyst activity was the same as that obtained on the same catalyst pretreated in the usual way with hydrogen sulfide rather than ethylene.

The catalyst's sensitivity to unit upsets was tested after 20 hours of steady-state reforming operations. In this simulated upset, the liquid feed rate was suddenly cut by a factor of 3.7 while the hydrogen feed rate, furnace temperature, and reactor pressure were left unchanged. FIG. 2 shows the response of catalyst temperature following the feed rate change for the Pt-Ir catalysts pretreated in three different ways. With no pretreatment other than routine reduction in hydrogen, the catalyst temperature increases by more than 316° C. within minutes of the hydrocarbon feed rate reduction (curve a). The same initial catalyst pretreated with ethylene according to this example also goes into thermal runaway, but only after a substantial time delay of 40 minutes (curve b). The same initial catalyst pretreated with flowing $H_2S$ for 2 minutes at 450° C. also develops thermal runaway sometime after the reduction in hydrocarbon feed rate (curve c). From these curves it is apparent that the $H_2S$ and ethylene pretreatment methods are both effective in significantly delaying the onset of temperature runaway following an upset such as sudden hydrocarbon feed loss; the ethylene pre-treated catalyst being particularly effective in delaying the temperature runaway. This is clearly advantageous in a large scale commercial reactor where the delay provides sufficient time for implementing corrective measures and averting a thermal runaway, e.g., lowering temperature, reducing pressure, re-establishing feed.

TABLE 6

Composition of Hydrocarbon Feed Used in Example 7

|  | Number of C Atoms | Mole Percent |
|---|---|---|
| Paraffins | 5 | 4 |
|  | 6 | 6 |
|  | 7 | 16 |
|  | 8 | 12 |
|  | 9 | 5 |
| Aromatics | 6 | 1.7 |
|  | 7 | 10 |
|  | 8 | 18 |
|  | 9 | 16 |
|  | 10 | 6 |

Average Molecular Weight = 102.8
0.33 ppm sulfur
85 Research Octane Number
ASTM D 86
ibp 43° C., 5% 76° C., 50% 122° C., 95% 162° C., fbp 177° C.

EXAMPLE 8

10,000 lb of 0.6% Pt/0.6% Ir on alumina catalyst in a commercial, semi-regenerative, reforming reactor was subjected to a standard regeneration and hydrogen reduction at 399° C. The reactor temperature was raised to 454° C. and hydrogen content in the recirculating gas system was reduced to below 0.1 vol. % by purging with nitrogen. 80 lb of ethylene was injected into the gas system just upstream of the reactor inlet over a period of 50 minutes while the reactor was maintained at 454° to 482° C. Ethylene was detected in the reactor outlet gas 5 minutes after injection started. On average, the catalyst was exposed to 9000 ppm ethylene for 45 minutes.

After injection of ethylene was completed, the treat continued by recirculation of the regeneration gases for about 6 hours at 454° C. Over the recirculation period the composition of these recirculating gases averaged: hydrogen=0.5 percent by volume, methane=1.5%, ethylene=100 vppm, ethane 0.3%, carbon monoxide=500 vppm, carbon dioxide=500 vppm. The reactor was depressurized, repressurized to 300 psig with hydrogen and hydrogen/naphtha feed was then introduced at 454° C. No hot spots were seen during pressurization and there were no temperature excursions following feed introduction. The performance of the catalyst, as indicated by the temperature drop caused by endothermic dehydrogenation of naphthenes to the desired aromatic products was comparable to previous cycles, where the catalyst was pretreated with hydrogen sulfide rather than ethylene.

TABLE 7

Temperature Profile from Commercial Runs

| | Sulfided | | Ethylene Pretreat |
|---|---|---|---|
| Location | Fresh A | Regenerated B | Regenerated C |
| Top | 479 | 478 | 480 |
| " | 479 | 477 | 479 |
| " | 476 | 474 | 478 |
| 25% | 472 | 469 | 473 |
| " | 473 | 469 | 474 |
| " | 472 | 467 | 473 |
| Middle | 472 | 467 | 471 |
| " | 471 | 467 | 469 |
| " | 472 | 467 | 468 |
| 75% | 473 | 467 | 470 |
| " | 472 | 466 | 469 |
| Bottom | 473 | 467 | 468 |
| " | 473 | 466 | 466 |
| " | 472 | 465 | 469 |

What is claimed is:

1. In a catalytic naphtha reforming process which comprises: contacting a naphtha feed with a noble metal reforming catalyst under reforming conditions at a temperature from about 650° F. to 1000° F. and at a pressure of about 1 to 50 atmospheres, the catalyst having both hydrogenolysis and reforming activity, and wherein the hydrogenolysis activity of the catalyst has been substantially reduced by contact with an unsaturated aliphatic hydrocarbon at a temperature of between 200° and 550° C.

2. A method according to claim 1 wherein the hydrogenolysis activity of the catalyst is further reduced by allowing the reactor gases to recirculate for a period of 15 minutes to 48 hours following catalyst contact with the unsaturated aliphatic hydrocarbon thereby affording at least a 0.5% increase in nongaseous product yields.

3. A method according to claim 1 wherein the catalyst comprises a support and a metal or metal combination selected from the group consisting of platinum, platinum-iridium, platinum-rhodium, platinum-rhodium-iridium, platinum-rhenium, platinum-iridiumrhenium, platinum-tin, platinum-rhenium-tin, platinum-iridium-tin, and palladium.

4. A method according to claim 1 wherein the catalyst comprises a platinum-rhenium catalyst.

5. A method according to claim 1 wherein the catalyst comprises a platinum-iridium catalyst.

6. A method according to claim 1 wherein the catalyst comprises a platinum-tin catalyst 7. A method according to claim 3 wherein the support is selected from the group consisting of silica, alumina, amorphous silica-alumina, tin modified alumina, and zeolites.

8. A method according to claim 7 wherein the support is L zeolite.

9. In a catalytic reforming process, operating at reforming conditions at a temperature from about 650° to 1000° F. and at a pressure of about 1 to 50 atmospheres, and capable of being subjected to conditions resulting in runaway exotherms, the improvement which comprises delaying said runaway exotherms by using a noble metal reforming catalyst, the catalyst having had its hydrogenolysis activity reduced by contact with an unsaturated aliphatic hydrocarbon at a temperature of between 200° and 550° C.

10. A method according to claim 9 wherein the catalyst is contacted with the unsaturated aliphatic hydrocarbon for a period from 3 minutes to 10 hours.

11. A method according to claim 9 wherein the unsaturated aliphatic hydrocarbon comprises ethylene.

* * * * *